United States Patent
Gao et al.

(10) Patent No.: US 12,504,736 B1
(45) Date of Patent: Dec. 23, 2025

(54) ERROR COMPENSATION METHOD FOR MULTI-AXIS PARALLEL KINEMATICS MACHINE TOOLS, A DEVICE, AN ELECTRONIC EQUIPMENT AND A STORAGE MEDIUM THEREOF

(71) Applicant: GUANGDONG UNIVERSITY OF TECHNOLOGY, Guangzhou (CN)

(72) Inventors: Jian Gao, Guangzhou (CN); Yuheng Luo, Guangzhou (CN); Lanyu Zhang, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 19/024,035

(22) Filed: Jan. 16, 2025

(51) Int. Cl.
G05B 19/404 (2006.01)

(52) U.S. Cl.
CPC .. G05B 19/404 (2013.01); *G05B 2219/39191* (2013.01)

(58) Field of Classification Search
CPC .................. G05B 19/404; G05B 2219/39191
See application file for complete search history.

(56) References Cited

U.S. PATENT DOCUMENTS

2011/0224958 A1   9/2011  Yang et al.

FOREIGN PATENT DOCUMENTS

| CN | 104057363 A | 9/2014 |
|----|-------------|--------|
| CN | 107479497 A | 12/2017 |
| CN | 109176531 A | 1/2019 |
| CN | 109960215 A | 7/2019 |

(Continued)

OTHER PUBLICATIONS

Luo, Y., Gao, J., Chen, D., Zhang, L., Liu, Y., & Zhong, Y. (2024). Accurate error compensation method for multi-axis parallel machine via singularized Jacobi geometric . . . Robotics and Computer-Integrated Manufacturing, 89, 102771. https://doi.org/10.101 (Year: 2024).*

(Continued)

*Primary Examiner* — Thomas C Lee
*Assistant Examiner* — Tyler Dean Hedrick

(57) ABSTRACT

An error compensation method for multi-axis parallel kinematics machine tools, including: building a theoretical Jacobian model of a multi-axis parallel machine tool to be compensated; and obtaining several geometric parameters of the theoretical Jacobian model and constructing a singularized geometric error model; constructing a singularized geometric error model with modeling error; solving the singularized geometric error model to obtain a singularized geometric error; substituting the singularized geometric error into the theoretical Jacobian model to construct a Jacobian model with correction term; generating a correction value of a motor of the multi-axis parallel machine tool to be compensated; calculating a corrected total displacement of the motor; substituting the corrected total displacement into an error prediction evaluation model to calculate predicted compensation errors under different geometric parameters; selecting a minimum predicted compensation error as a target compensation error. Thus improving the accuracy of error compensation for multi-axis parallel kinematics machine tools.

4 Claims, 5 Drawing Sheets

(56) References Cited

FOREIGN PATENT DOCUMENTS

| CN | 113325802 A | 8/2021 |
|----|-------------|--------|
| CN | 113927599 A | 1/2022 |
| CN | 114237155 A | 3/2022 |
| CN | 117170307 A | 12/2023 |

OTHER PUBLICATIONS

Qi Jimin et al., Differential Change Construction Based Geometric Error Compensation for Machine, Transactions of the Chinese Society of Agricultural Machinery, vol. 47, No. 9, Sep. 30, 2016.

* cited by examiner

```
┌─────────────────────────────────────────────────────────────────────┐  S11
│  Calculating a modeling error difference between the theoretical    │
│  Jacobian model and the singularized geometric error model          │
└─────────────────────────────────────────────────────────────────────┘
                                  │
                                  ▼
┌─────────────────────────────────────────────────────────────────────┐  S12
│  Substituting the modeling error difference into the singularized   │
│  geometric error model to construct the singularized geometric      │
│  error model with modeling error                                    │
└─────────────────────────────────────────────────────────────────────┘
```

FIG. 4

```
┌─────────────────────────────────────────────────────────────────────┐  S21
│  Inputting the corrected total displacement of the motor into a     │
│  virtual linear model to obtain a correction output of the motor    │
└─────────────────────────────────────────────────────────────────────┘
                                  │
                                  ▼
┌─────────────────────────────────────────────────────────────────────┐  S22
│  Calculating a theoretical virtual output of the virtual linear     │
│  model under a theoretical input of the motor                       │
└─────────────────────────────────────────────────────────────────────┘
                                  │
                                  ▼
┌─────────────────────────────────────────────────────────────────────┐  S23
│  Calculating a first output ratio between the correction output     │
│  and the theoretical virtual output                                 │
└─────────────────────────────────────────────────────────────────────┘
                                  │
                                  ▼
┌─────────────────────────────────────────────────────────────────────┐  S24
│  Obtaining an actual model deviation coefficient                    │
└─────────────────────────────────────────────────────────────────────┘
                                  │
                                  ▼
┌─────────────────────────────────────────────────────────────────────┐  S25
│  Calculating a second output ratio between the correction output    │
│  and an actual physical model output based on the actual model      │
│  deviation coefficient and the first output ratio                   │
└─────────────────────────────────────────────────────────────────────┘
                                  │
                                  ▼
┌─────────────────────────────────────────────────────────────────────┐  S26
│  Obtaining a kinematic theoretical output of the virtual linear     │
│  model under the theoretical input of the motor                     │
└─────────────────────────────────────────────────────────────────────┘
                                  │
                                  ▼
┌─────────────────────────────────────────────────────────────────────┐  S27
│  Calculating the predicted compensation errors under different      │
│  geometric parameters based on the second output ratio and the      │
│  kinematic theoretical output                                       │
└─────────────────────────────────────────────────────────────────────┘
```

FIG. 5

ERROR COMPENSATION METHOD FOR MULTI-AXIS PARALLEL KINEMATICS MACHINE TOOLS, A DEVICE, AN ELECTRONIC EQUIPMENT AND A STORAGE MEDIUM THEREOF

TECHNICAL FIELD

The present disclosure relates to the technical field of error compensation, in particular to an error compensation method for multi-axis parallel kinematics machine tools, a device, an electronic equipment and a storage medium thereof.

BACKGROUND

With the development of technologies in microelectronics, military industry, aerospace, and other fields, the requirements for part machining precision and complexity have become increasingly stringent. Multi-degree-of-freedom mechanisms, represented by precision five-axis machine tools and high-precision robots, have gained significant attention. However, due to manufacturing and assembly errors, there is a substantial deviation between the actual structure and the theoretical structure of the mechanism, which reduces its pose accuracy. Error compensation is an effective method for improving pose accuracy, but its effectiveness heavily relies on the accuracy of the error model established. Traditional error compensation methods for end effector of multi-axis parallel kinematics machine tools primarily use Jacobian modeling. However, in Jacobian matrix-based compensation methods, there are errors in the geometric parameters of the Jacobian matrix compared to the actual parameters. Additionally, the use of equivalent infinitesimal substitutions and neglecting higher-order small terms during the Jacobian modeling process can lead to modeling errors in the Jacobian model. This results in residual errors even after multi-axis error compensation, affecting the operational precision of the end effector of the mechanism.

SUMMARY

The present disclosure provides an error compensation method for multi-axis parallel kinematics machine tools, a device, an electronic equipment and a storage medium thereof, to solve the technical problem of lower accuracy of the traditional error compensation methods.

To realize the above objective, the present disclosure provides an error compensation method for multi-axis parallel kinematics machine tools, including: building a theoretical Jacobian model of a multi-axis parallel machine tool to be compensated; and obtaining several geometric parameters of the theoretical Jacobian model and constructing a singularized geometric error model according to the geometric parameters; and constructing a singularized geometric error model with modeling error based on the theoretical Jacobian model and the singularized geometric error model; and solving the singularized geometric error model with modeling error to obtain a singularized geometric error with modeling error; and substituting the singularized geometric error with modeling error into the theoretical Jacobian model to construct a Jacobian model with correction term; and generating a correction value of a motor of the multi-axis parallel machine tool to be compensated based on the Jacobian model with correction term; and calculating a corrected total displacement of the motor based on the correction value of the motor; and substituting the corrected total displacement into an error prediction evaluation model to calculate predicted compensation errors under different geometric parameters; and selecting a minimum predicted compensation error corresponding to each geometric parameter as a target compensation error.

Furthermore, the step of building a theoretical Jacobian model of a multi-axis parallel machine tool to be compensated includes: obtaining a motor compensation value and an end effector error of the multi-axis parallel machine tool to be compensated; and constructing the theoretical Jacobian model based on the motor compensation value and the end effector errors.

Furthermore, the step of constructing a singularized geometric error model with modeling error based on the theoretical Jacobian model and the singularized geometric error model includes: calculating a modeling error difference between the theoretical Jacobian model and the singularized geometric error model; and substituting the modeling error difference into the singularized geometric error model to construct the singularized geometric error model with modeling error.

Furthermore, the step of substituting the corrected total displacement into an error prediction evaluation model to calculate predicted compensation errors under different geometric parameters includes: inputting the corrected total displacement of the motor into a virtual linear model to obtain a correction output of the motor; and calculating a theoretical virtual output of the virtual linear model under a theoretical input of the motor; and calculating a first output ratio between the correction output and the theoretical virtual output; and obtaining an actual model deviation coefficient; and calculating a second output ratio between the correction output and an actual physical model output based on the actual model deviation coefficient and the first output ratio; and obtaining a kinematic theoretical output of the virtual linear model under the theoretical input of the motor; and calculating the predicted compensation errors under different geometric parameters based on the second output ratio and the kinematic theoretical output.

The present disclosure further provides an error compensation device for multi-axis parallel kinematics machine tools, wherein, including: a construction module of a theoretical Jacobian model, configured for building the theoretical Jacobian model of a multi-axis parallel machine tool to be compensated; and a construction module of a singularized geometric error model, configured for obtaining several geometric parameters of the theoretical Jacobian model and constructing the singularized geometric error model according to the geometric parameters; and a construction module of a singularized geometric error model with modeling error, configured for constructing the singularized geometric error model with modeling error based on the theoretical Jacobian model and the singularized geometric error model; and a construction module of a singularized geometric error with modeling error, configured for solving the singularized geometric error model with modeling error to obtain the singularized geometric error with modeling error; and a construction module of a Jacobian model with correction term, configured for substituting the singularized geometric error with modeling error into the theoretical Jacobian model to construct the Jacobian model with correction term; and a generation module of a correction value, configured for generating the correction value of a motor of the multi-axis parallel machine tool to be compensated based on the Jacobian model with correction term; and a calculation module of a corrected total displacement, configured for calculating the corrected total displacement of the motor based on the correction value of the motor; and a calculation module of predicted compensation errors, configured for substituting the corrected total displacement into an error prediction evaluation model to the calculate predicted compensation errors under different geometric parameters; and a selection module of a minimum predicted compensation error, configured for selecting the minimum predicted compensation error corresponding to each geometric parameter as a target compensation error.

Furthermore, the construction module of a theoretical Jacobian model includes: an obtaining sub-module of motor compensation value and an end effector error, configured for obtaining a motor compensation value and an end effector error of the multi-axis parallel machine tool to be compensated; and a construction sub-module of the theoretical Jacobian model, configured for constructing the theoretical Jacobian model based on the motor compensation values and the end effector error.

Furthermore, the construction module of a singularized geometric error model with modeling error includes: a calculation sub-module of a modeling error difference, configured for calculating the modeling error difference between the theoretical Jacobian model and the singularized geometric error model; and a construction sub-module of the singularized geometric error model with modeling error, configured for substituting the modeling error difference into the singularized geometric error model to construct the singularized geometric error model with modeling error.

Furthermore, the calculation module of predicted compensation errors includes: an obtaining sub-module of a correction output, configured for inputting the corrected total displacement of the motor into a virtual linear model to obtain the correction output of the motor; and a calculation sub-module of a theoretical virtual output, configured for calculating the theoretical virtual output of the virtual linear model under a theoretical input of the motor; and a calculation sub-module of a first output ratio, configured for calculating the first output ratio between the correction output and the theoretical virtual output; an obtaining sub-module of an actual model deviation coefficient, configured for obtaining the actual model deviation coefficient; and a calculation sub-module of a second output ratio, configured for calculating the second output ratio between the correction output and an actual physical model output based on the actual model deviation coefficient and the first output ratio; and an obtaining sub-module of a kinematic theoretical output, configured for obtaining the kinematic theoretical output of the virtual linear model under the theoretical input of the motor; and a calculation sub-module of the predicted compensation errors, configured for calculating the predicted compensation errors under different geometric parameters based on the second output ratio and the kinematic theoretical output.

The present disclosure further provides an electronic equipment, the electronic equipment includes a processor and a memory, the memory is configured to store program code and transmit the program code to the processor; the processor is configured to execute an error compensation method for multi-axis parallel kinematics machine tools mentioned above based on the instructions in the program code.

The present disclosure further provides a non-transitory computer-readable storage medium, wherein the non-transitory computer-readable storage medium is configured to store program code, and the program code is configured to execute an error compensation method for multi-axis parallel kinematics machine tools mentioned above.

The present disclosure has disclosed an error compensation method for multi-axis parallel kinematics machine tools, including building a theoretical Jacobian model of a multi-axis parallel machine tool to be compensated; and obtaining several geometric parameters of the theoretical Jacobian model and constructing a singularized geometric error model according to the geometric parameters; and constructing a singularized geometric error model with modeling error based on the theoretical Jacobian model and the singularized geometric error model; and solving the singularized geometric error model with modeling error to obtain a singularized geometric error with modeling error; and substituting the singularized geometric error with modeling error into the theoretical Jacobian model to construct a Jacobian model with correction term; and generating a correction value of a motor of the multi-axis parallel machine tool to be compensated based on the Jacobian model with correction term; and calculating a corrected total displacement of the motor based on the correction value of the motor; and substituting the corrected total displacement into an error prediction evaluation model to calculate predicted compensation errors under different geometric parameters; and selecting a minimum predicted compensation error corresponding to each geometric parameter as a target compensation error. Thus improving the accuracy of error compensation for multi-axis parallel kinematics machine tools.

BRIEF DESCRIPTION OF THE DRAWINGS

In order to clearly illustrate the technical solutions of the embodiments of the present disclosure or prior art, the following provides a brief introduction to the drawings that are necessary for the description of the embodiments or prior art. It is evident that the drawings described below are merely some embodiments of the present disclosure. For those skilled in the art, without any inventive effort, other drawings can also be derived from these illustrations.

FIG. 4 is a flowchart of sub-steps of the error compensation method for multi-axis parallel kinematics machine tools according to another embodiment of the present disclosure.

FIG. 5 is a flowchart of sub-steps of the error compensation method for multi-axis parallel kinematics machine tools according to another embodiment of the present disclosure.

DETAILED DESCRIPTION OF THE EMBODIMENTS

The traditional error compensation methods error compensation method for end-effector of multi-axis parallel kinematics machine tools mainly rely on Jacobian modeling.

However, in the Jacobian matrix based compensation methods, there exist certain errors between the geometric parameters in the Jacobian matrix and the actual parameters. Accurately obtaining the geometric parameter correction values of the Jacobian model and modifying the Jacobian model is key to improving the pose accuracy of the end-effector of the multi-axis parallel kinematics machine tool. In this process, the geometric parameter errors in the Jacobian model, the modeling errors introduced by the equivalent substitutions (equivalent infinitesimal replacement and neglecting higher-order small quantities) in the Jacobian solving process, as well as the modeling error coupling caused by substituting different single geometric errors into the Jacobian model, can lead to different compensation effects, thereby affecting the accuracy of the error compensation.

Figure 1:
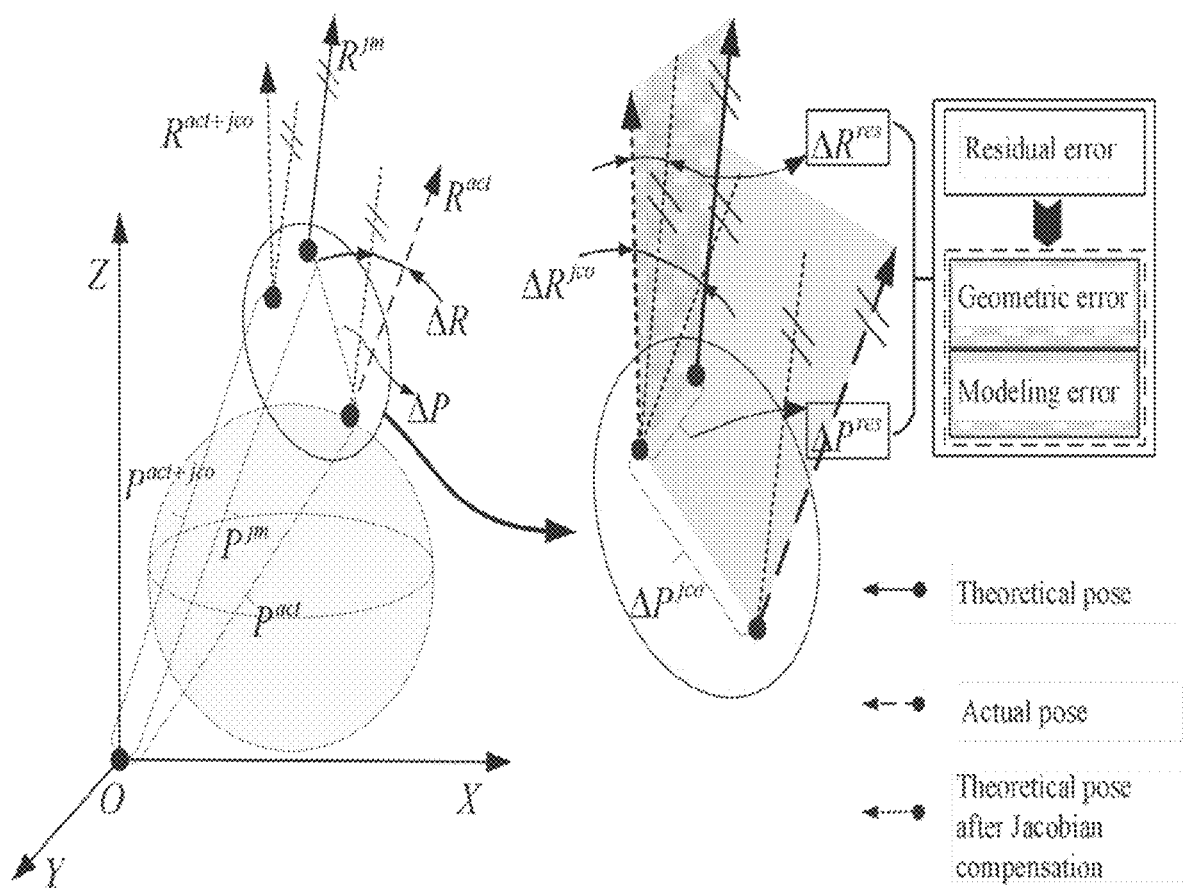
FIG. 1 is a schematic diagram of a residual error after Jacobian compensation.

As shown in FIG. 1, FIG. 1 is a schematic diagram of a residual error after Jacobian compensation (where $R^{act+jco}$ is the orientation after theoretical Jacobian compensation, $P^{act+jco}$ is the position after theoretical Jacobian compensation, $R^{jm}$ is the theoretical orientation, $P^{jm}$ is a the theoretical position, $R^{act}$ is the actual orientation, $P^{act}$ is the actual position, $\Delta R$ is the theoretical orientation error, $\Delta P$ is the theoretical position error, $\Delta R^{res}$ is the residual orientation error after theoretical Jacobian compensation, $\Delta P^{res}$ is the residual orientation error after theoretical Jacobian compensation, and $\Delta R^{jco}$ is the residual position error after theoretical Jacobian compensation, $\Delta R^{jco}$ is the actual orientation error after theoretical Jacobian compensation, $\Delta P^{jco}$ is the actual position error after theoretical Jacobian compensation).

In view of this, embodiments of the present disclosure provide an error compensation method for multi-axis parallel kinematics machine tools, a device, an electronic equipment and a storage medium thereof, which aim to address the technical issue of poor accuracy in existing error compensation methods of the multi-axis parallel machine tools.

To make the objectives, features, and advantages of the present disclosure more apparent and easier to understand, the following will provide a clear and complete description of the technical solutions in the embodiments of the present disclosure in conjunction with the drawings. It is evident that the embodiments described below are merely a part of the embodiments of the present disclosure, and not all of them. All other embodiments that can be derived by those skilled in the art based on the embodiments in the present disclosure without requiring any inventive effort are within the scope of protection of the present disclosure.

Figure 2:
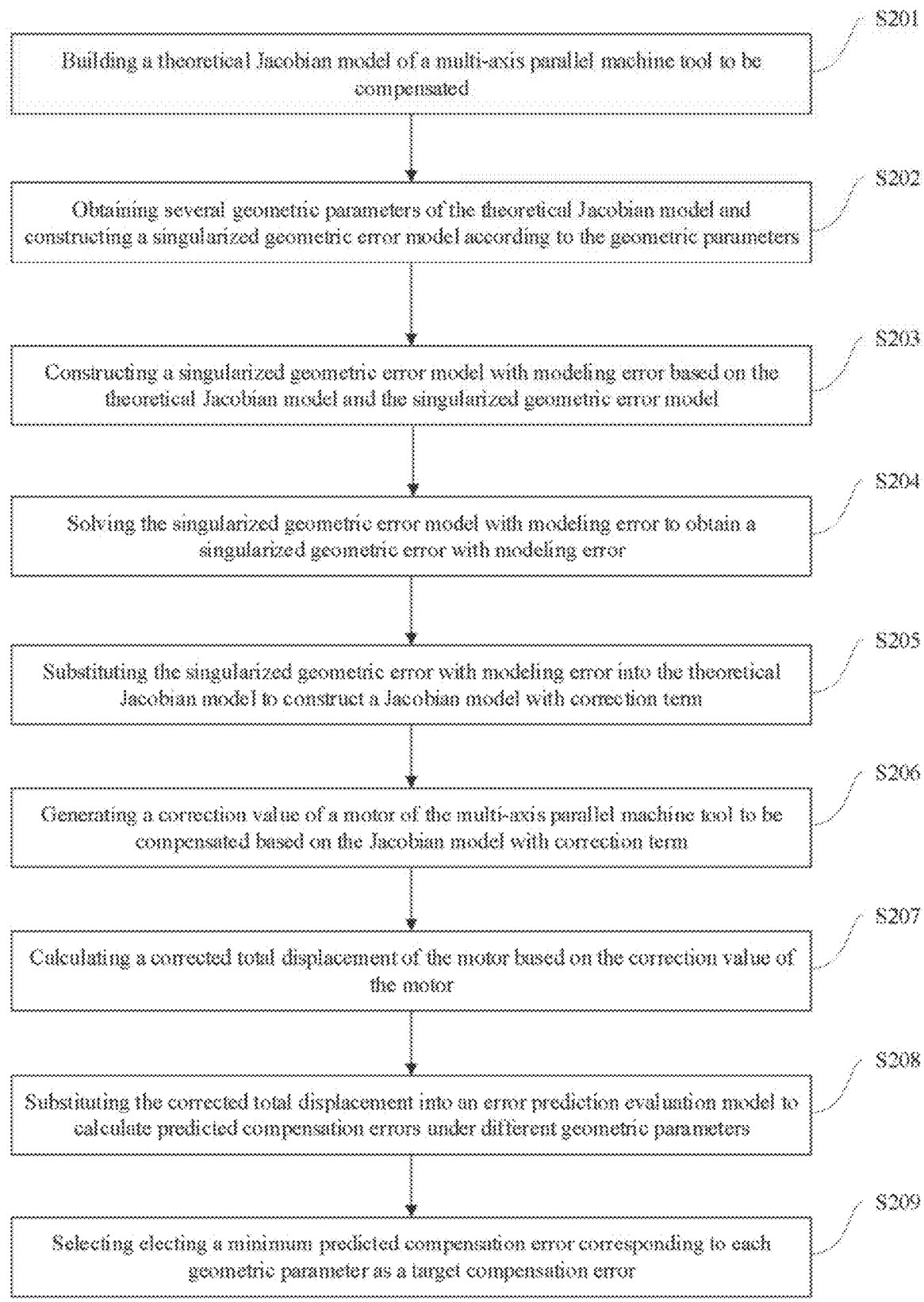
FIG. 2 is a flowchart of steps of an error compensation method for multi-axis parallel kinematics machine tools according to an embodiment of the present disclosure.

Please refers to FIG. 2, FIG. 2 is a flowchart of steps of an error compensation method for multi-axis parallel kinematics machine tools according to an embodiment of the present disclosure.

The present disclosure provides an error compensation method for multi-axis parallel kinematics machine tools, and the error compensation method includes the following steps of S201 to S209.

S201, building a theoretical Jacobian model of a multi-axis parallel machine tool to be compensated.

S202, obtaining several geometric parameters of the theoretical Jacobian model and constructing a singularized geometric error model according to the geometric parameters.

EXPLANATION OF RELATED TERMS

Geometric error: the deviation between the actual shape, direction, and pose of the various elements of a part and their ideal shape, direction, and pose is called the geometric error.

In practical applications, traditional error compensation methods for end effector of multi-axis parallel kinematics machine tool primarily rely on Jacobian modeling. However, in the Jacobian matrix-based compensation method, there is a certain error between the geometric parameters in the Jacobian matrix and the actual parameters. This disclosure eliminates the geometric error in the Jacobian model by constructing a theoretical Jacobian model for multi-axis parallel machine tools and a single geometric error model.

Jacobian matrix: in vector calculus, the Jacobian matrix is a matrix composed of first-order partial derivatives arranged in a specific manner. Its determinant is referred to as the Jacobian determinant. The importance of the Jacobian matrix lies in its representation of the optimal linear approximation of a differentiable function at a given point. Therefore, the Jacobian matrix is analogous to the derivative of a multivariable function.

S203, constructing a singularized geometric error model with modeling error based on the theoretical Jacobian model and the singularized geometric error model.

S204, solving the singularized geometric error model with modeling error to obtain a singularized geometric error with modeling error.

After the theoretical Jacobian model and the singularized geometric error model are constructed, the theoretical Jacobian model and the singularized geometric error model are adopted to construct the singularized geometric error with modeling error. And through solving the singularized geometric error model with modeling error to obtain a singularized geometric error with modeling error.

S205, substituting the singularized geometric error with modeling error into the theoretical Jacobian model to construct a Jacobian model with correction term.

After obtaining the singularized geometric error with modeling error, then substituting the singularized geometric error with modeling error into the theoretical Jacobian model to construct a Jacobian model with correction term.

S206, generating a correction value of a motor of the multi-axis parallel machine tool to be compensated based on the Jacobian model with correction term.

S207, calculating a corrected total displacement of the motor based on the correction value of the motor.

After obtaining the Jacobian model with correction term, the Jacobian model with correction term can be adopted to construct the correction value of a motor of the multi-axis parallel machine tool, and further to calculate the corrected total displacement.

S208, substituting the corrected total displacement into an error prediction evaluation model to calculate predicted compensation errors under different geometric parameters.

After obtaining the corrected total displacement of the motor, adopting the error prediction evaluation model to calculate predicted compensation errors under different geometric parameters.

S209, selecting a minimum predicted compensation error corresponding to each geometric parameter as a target compensation error.

After obtaining predicted compensation errors under different geometric parameters, selecting the minimum predicted compensation error corresponding to each geometric parameter as a target compensation error, and the corrected total displacement corresponding to the target compensation error is a motor target displacement. That is, selecting the minimum predicted compensation error corresponding to corrected motor total displacement as the motor target displacement.

This embodiment provides the error compensation method for multi-axis parallel kinematics machine tools, including building a theoretical Jacobian model of a multi-axis parallel machine tool to be compensated; and obtaining several geometric parameters of the theoretical Jacobian model and constructing a singularized geometric error model according to the geometric parameters; and constructing a singularized geometric error model with modeling error based on the theoretical Jacobian model and the singularized geometric error model; and solving the singularized geometric error model with modeling error to obtain a singularized geometric error with modeling error; and substituting the singularized geometric error with modeling error into the theoretical Jacobian model to construct a Jacobian model with correction term; and generating a correction value of a motor of the multi-axis parallel machine tool to be compensated based on the Jacobian model with correction term; and calculating a corrected total displacement of the motor based on the correction value of the motor; and substituting the corrected total displacement into an error prediction evaluation model to calculate predicted compensation errors under different geometric parameters; and selecting a minimum predicted compensation error corresponding to each geometric parameter as a target compensation error. Thus improving the accuracy of error compensation for multi-axis parallel kinematics machine tools.

Figure 3:
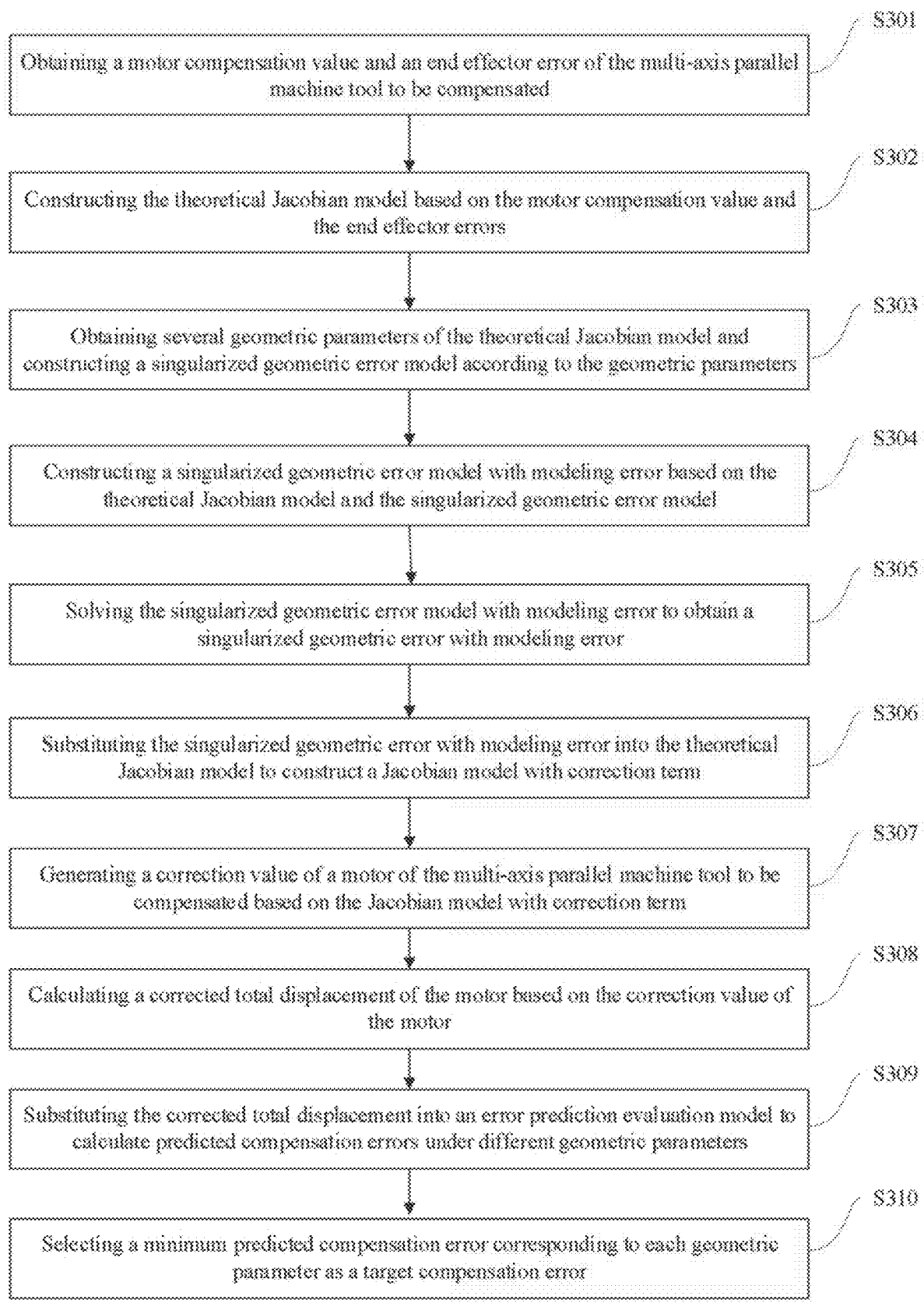
FIG. 3 is a flowchart of steps of the error compensation method for multi-axis parallel kinematics machine tools according to another embodiment of the present disclosure.

Please refers to FIG. 3, FIG. 3 is a flowchart of steps of the error compensation method for multi-axis parallel kinematics machine tools according to another embodiment of the present disclosure. Specifically, including the following steps of S301 to S310.

S301, obtaining a motor compensation value and an end effector error of the multi-axis parallel machine tool to be compensated.

S302, constructing the theoretical Jacobian model based on the motor compensation value and the end effector error.

In this embodiment, the theoretical Jacobian model can be expressed as:

$\delta \hat{Q} = J \delta E$;

$\delta \hat{Q}$ is the motor compensation value, J is the theoretical Jacobian model, and $\delta E$ is the end effector error.

S303, obtaining several geometric parameters of the theoretical Jacobian model and constructing a singularized geometric error model according to the geometric parameters.

In this embodiment, the singularized geometric error model can be established by perturbing or differentiating singularized geometric parameters of the theoretical Jacobian model.

The singularized geometric error model is as follows:

$z^{jin+\delta} + s^{jin+\delta}H_1 + c^{jin+\delta}H_2^{jin+\delta}H_1 + H_2^{jin\delta}Q = 0$.

Expand as:

$\delta z + \delta s H_1 + (\delta c H_2 + \delta c \delta H_2 + c \delta H_2) H_1 + \delta H_2 Q = 0$;

wherein, $\delta z$ is a position matrix with perturbation error, $\delta s$ is a orientation matrix with perturbation error composed of the sin function, $H_1$ is a first geometric parameter matrix, $\delta H_2$ is a second geometric parameter matrix with perturbation error, $\delta c$ is a orientation matrix with perturbation error composed of the cos function, jm is the theoretical value, $\delta$ is the perturbation error, and Q is the motor displacement.

S304, constructing a singularized geometric error model with modeling error based on the theoretical Jacobian model and the singularized geometric error model.

After obtaining the theoretical Jacobian model and the singularized geometric error model, adopting the theoretical Jacobian model and the singularized geometric error model to construct the singularized geometric error model with modeling error.

In an embodiment, as shown in FIG. 4, FIG. 5 is a flowchart of sub-steps of the error compensation method for multi-axis parallel kinematics machine tools according to another embodiment of the present disclosure, the S304 includes the following sub-steps S11 to S12:

S11, calculating a modeling error difference between the theoretical Jacobian model and the singularized geometric error model.

In this embodiment, the modeling error difference between the theoretical Jacobian model and the singularized geometric error model can be expressed as:

$\Delta E^{JM} = \delta H_2 H_1(\hat{c}^{jm+\delta} - c^{\delta\alpha \to 0})$; and $$\hat{e} = \begin{bmatrix} 1 & 0 \\ 0 & 1 \end{bmatrix};$$

and $$\hat{c}^{jm+\delta} = \begin{bmatrix} \cos(\alpha^{jm} + \delta\alpha) & 0 \\ 0 & \cos(\alpha^{jm} + \delta\alpha) \end{bmatrix};$$

and $c\delta\alpha \to 0 = c - \hat{e} + \delta c$

α is a orientation parameter.

S12, substituting the modeling error difference into the singularized geometric error model to construct the singularized geometric error model with modeling error.

Substituting the modeling error difference $\Delta E^{JM}$ into the singularized geometric error model, to construct the singularized geometric error model with modeling error. The singularized geometric error model with modeling error can be expressed as:

$\delta z + \delta s H_1 + \delta c H_2 H_1 + (\hat{c}^{jm+\delta} H_1 + H_1 + Q) \delta H_2 = 0$.

S305, solving the singularized geometric error model with modeling error to obtain a singularized geometric error with modeling error. The singularized geometric error with modeling error includes a first singularized geometric error with modeling error and a second singularized geometric error with modeling error.

Solving the singularized geometric error model with modeling error, to obtain a singularized geometric error with modeling error. And the singularized geometric error with modeling error can be expressed as:

$\delta H_2 = (-\delta z - \delta s H_1 - \delta c H_2 H_1)(\hat{c}^{jm+\delta} H_1 + H_1 + Q)$; and $\delta H_1 = (-\delta z - \delta s H_1 - \delta c H_2 H_1)(\hat{c}^{jm+\delta} H_2 + s^{jm+\delta} + H_1)^{-1}$.

Wherein, $\delta H_1$ is a first singularized geometric error with modeling error, $\delta H_2$ is a second singularized geometric error with modeling error.

S306, substituting the singularized geometric error with modeling error into the theoretical Jacobian model to construct a Jacobian model with correction term. The Jacobian model with correction term includes a first Jacobian model with correction term and a second Jacobian model with correction term.

Substituting the first singularized geometric error with modeling error $\delta H_1$ and the second singularized geometric error with modeling error $\delta H_2$ into the theoretical Jacobian model to construct the Jacobian model with correction term. And the Jacobian model with correction term can be expressed as:

$$\begin{cases} J^{H_1 act} = J\big|_{H_1 = H_1^{JM} + \delta H_1} \\ J^{H_2 act} = J\big|_{H_2 = H_2^{JM} + \delta H_2} \end{cases};$$

wherein, $J^{H_1 act}$ is the first Jacobian model with correction term, $J^{H_2 act}$ is the second first Jacobian model with correction term, $H_1^{JM}$ is a first theoretical value, and $H_2^{JM}$ is a second theoretical value.

S307, generating a correction value of a motor of the multi-axis parallel machine tool to be compensated based on the Jacobian model with correction term.

The correction value includes a first correction value and a second correction value. The correction value can be expressed as:

$$\begin{cases} \delta Q^{H_1 act} = J^{H_1 act} \delta E \\ \delta Q^{H_2 act} = J^{H_2 act} \delta E \end{cases};$$

wherein, $\delta Q^{H_1 act}$ is the first correction value, and $\delta Q^{H_2 act}$ is the second correction value.

S308, calculating a corrected total displacement of the motor based on the correction value of the motor.

The corrected total displacement includes a first corrected total displacement and a second corrected total displacement.

The corrected total displacement of the motor can be expressed as:

$$\begin{cases} Q^{jm+\Delta H_1} = Q^{jm} + \delta Q^{H_1 act} \\ Q^{jm+\Delta H_2} = Q^{jm} + \delta Q^{H_2 act} \end{cases};$$

wherein, $$Q^{jm+\Delta H_1}$$

is the first corrected motor total displacement, $$Q^{jm+\Delta H_2}$$

is the second corrected total displacement, and $Q^{jm}$ is the motor theoretical value.

S309, substituting the corrected total displacement into an error prediction evaluation model to calculate predicted compensation errors under different geometric parameters.

After obtaining the corrected total displacement, a calculation module of predicted compensation errors can be adopted to calculated predicted compensation errors under different geometric parameters.

In another embodiment, as shown in FIG. 5, FIG. 5 is a flowchart of sub-steps of the error compensation method for multi-axis parallel kinematics machine tools according to another embodiment of the present disclosure, S309 includes sub-steps of S21 to S27.

S21, inputting the corrected total displacement of the motor into a virtual linear model to obtain a correction output of the motor.

S22, calculating a theoretical virtual output of the virtual linear model under a theoretical input of the motor.

S23, calculating a first output ratio between the correction output and the theoretical virtual output.

S24, obtaining an actual model deviation coefficient.

S25, calculating a second output ratio between the correction output and an actual physical model output based on the actual model deviation coefficient and the first output ratio.

S26, obtaining a kinematic theoretical output of the virtual linear model under the theoretical input of the motor.

S27, calculating the predicted compensation errors under different geometric parameters based on the second output ratio and the kinematic theoretical output.

Specifically, the virtual linear model based on sensitivity can be expressed as:

$$\hat{E} = \sigma Q;$$

wherein, $\hat{E}$ is a displacement of the end effector, $\sigma$ is a sensitivity coefficient, that is, $\sigma$ is a matrix element of $J^{-1}$.

A theoretical virtual output of the virtual linear model under an input of the theoretical motor can be expresses as:

$$\hat{E}^\gamma = \sigma Q^{jm}.$$

An actual model deviation coefficient can be expressed as: $\zeta = e - \Delta X./X.$ wherein, $\zeta$ is an actual model deviation coefficient, $\Delta X$ is a measured kinematic error, and $X$ is a kinematic theoretical output.

Substituting the corrected total displacement of the motor into the virtual linear model, the corrected output of the motor can be obtained as follows:

$$\hat{E}^v = \sigma Q^{jm+\Delta}.$$

A first output ratio between the motor correction output and the theoretical virtual output is: $\tau = \hat{E}^v./\hat{E}^\gamma$.

A second output ratio between the motor correction output and the theoretical virtual output is $\eta = \tau.*\zeta$.

The actual output of the motor correction is $A = \eta.*X$.

The predicted compensation errors under different geometric parameters can be expressed as $E = abs(A-X) = abs(X.*(\tau.*\zeta - 1))$.

S310, selecting a minimum predicted compensation error corresponding to each geometric parameter as a target compensation error.

After obtaining the predicted compensation errors, selecting the minimum predicted compensation error corresponding to each geometric parameter as a target compensation error, and the corrected total displacement corresponding to the target compensation error is a motor target displacement.

This disclosure accurately solves the analytical solution of the Jacobian geometric parameters, including both geometric errors and modeling errors, transforming the original nonlinear indeterminate equations into linear equations. Which avoids the problems of multiple solutions or no solutions that arise during direct solving, as well as the weak generalization issues of iterative methods. It eliminates the residual errors of traditional Jacobian methods, thereby improving the pose accuracy of multi-axis mechanisms and ensuring the end effector of multi-axis mechanisms or equipment meets the requirements for high-precision operations.

Figure 6:
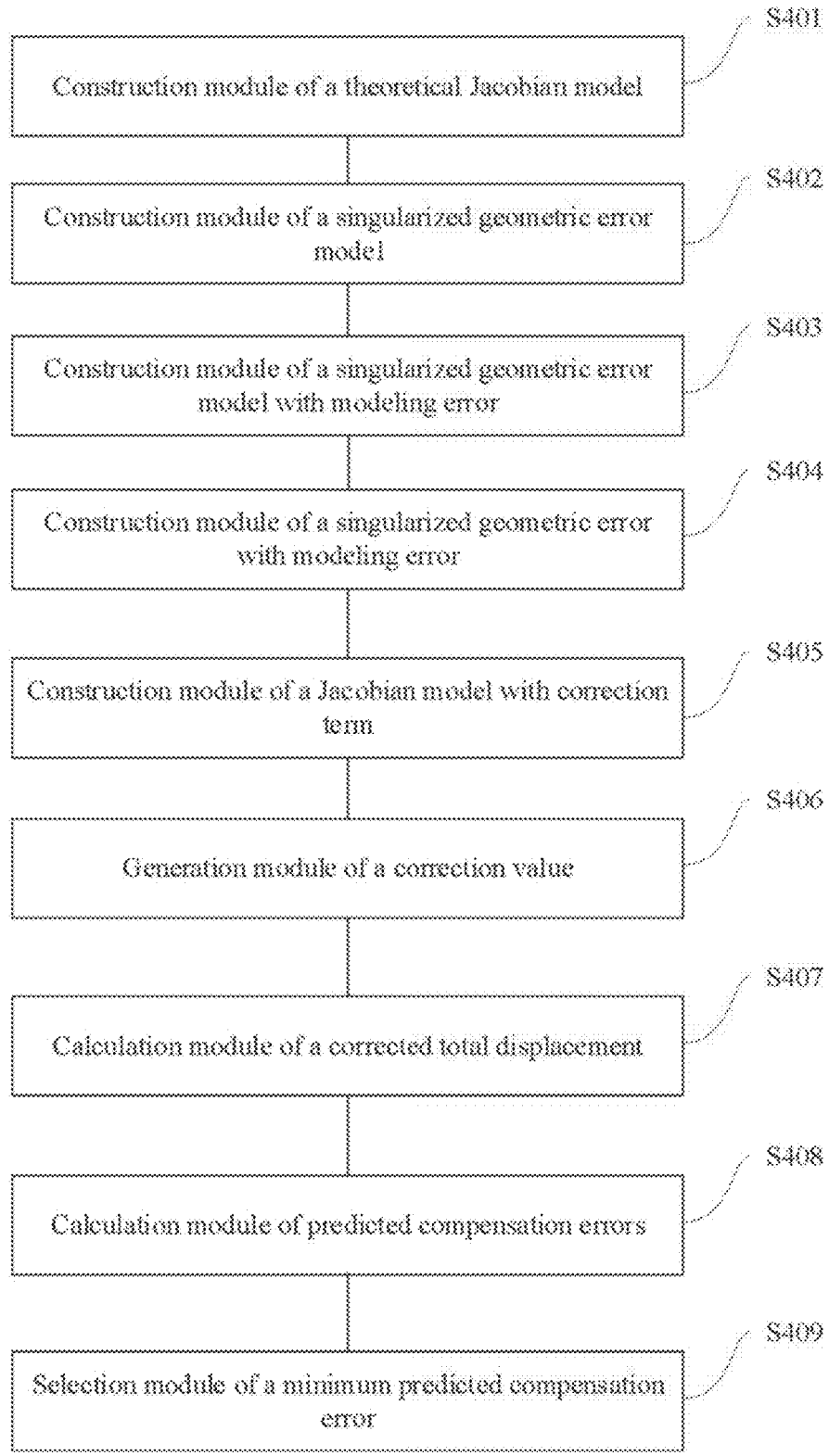
FIG. 6 is a block diagram of a structure of an error compensation device for multi-axis parallel kinematics machine tools according in an embodiment of the present disclosure.

Please refers to FIG. 6, FIG. 6 is a block diagram of a structure of an error compensation device for multi-axis parallel kinematics machine tools according in an embodiment of the present disclosure.

This embodiment provides a error compensation device for multi-axis parallel kinematics machine tools, including the following modules.

A construction module of a theoretical Jacobian model 401, configured for building the theoretical Jacobian model of a multi-axis parallel machine tool to be compensated.

A construction module of a singularized geometric error model 402, configured for obtaining several geometric parameters of the theoretical Jacobian model and constructing the singularized geometric error model according to the geometric parameters.

A construction module of a singularized geometric error model with modeling error 403, configured for constructing the singularized geometric error model with modeling error based on the theoretical Jacobian model and the singularized geometric error model.

A construction module of a singularized geometric error with modeling error 404, configured for solving the singularized geometric error model with modeling error to obtain the singularized geometric error with modeling error.

A construction module of a Jacobian model with correction term 405, configured for substituting the singularized geometric error with modeling error into the theoretical Jacobian model to construct the Jacobian model with correction term.

A generation module of a correction value 406, configured for generating the correction value of a motor of the multi-axis parallel machine tool to be compensated based on the Jacobian model with correction term.

A calculation module of a corrected total displacement 407, configured for calculating the corrected total displacement of the motor based on the correction value of the motor.

A calculation module of predicted compensation errors 408, configured for substituting the corrected total displacement into an error prediction evaluation model to the calculate predicted compensation errors under different geometric parameters.

A selection module of a minimum predicted compensation error 409, configured for selecting the minimum predicted compensation error corresponding to corrected motor total displacement as the motor target displacement.r.

In the present embodiment, the construction module of a theoretical Jacobian model 401 includes the following sub-modules: an obtaining sub-module of motor compensation value and an end effector error, configured for obtaining a motor compensation value and an end effector error of the multi-axis parallel machine tool to be compensated; and a construction sub-module of the theoretical Jacobian model, configured for constructing the theoretical Jacobian model based on the motor compensation values and the end effector error.

In the present embodiment, the construction module of a singularized geometric error model with modeling error 403 includes: a calculation sub-module of a modeling error difference, configured for calculating the modeling error difference between the theoretical Jacobian model and the singularized geometric error model; and a construction sub-module of the singularized geometric error model with modeling error, configured for substituting the modeling error difference into the singularized geometric error model to construct the singularized geometric error model with modeling error.

In the present embodiment, the calculation module of predicted compensation errors 408 includes: an obtaining sub-module of a correction output, configured for inputting the corrected total displacement of the motor into a virtual linear model to obtain the correction output of the motor; and a calculation sub-module of a theoretical virtual output, configured for calculating the theoretical virtual output of the virtual linear model under a theoretical input of the motor; and a calculation sub-module of a first output ratio, configured for calculating the first output ratio between the correction output and the theoretical virtual output; an obtaining sub-module of an actual model deviation coefficient, configured for obtaining the actual model deviation coefficient; a calculation sub-module of a second output ratio, configured for calculating the second output ratio between the correction output and an actual physical model output based on the actual model deviation coefficient and the first output ratio; an obtaining sub-module of a kinematic theoretical output, configured for obtaining the kinematic theoretical output of the virtual linear model under the theoretical input of the motor; a calculation sub-module of the predicted compensation errors, configured for calculating the predicted compensation errors under different geometric parameters based on the second output ratio and the kinematic theoretical output.

The present disclosure also provides an electronic equipment, the electronic equipment includes a processor and a memory, the memory is configured to store program code and transmit the program code to the processor; the processor is configured to execute an error compensation method for multi-axis parallel kinematics machine tools mentioned above based on the instructions in the program code.

The present disclosure also provides a non-transitory computer-readable storage medium, the non-transitory computer-readable storage medium is configured to store program code, and the program code is configured to execute an error compensation method for multi-axis parallel kinematics machine tools mentioned above.

The skilled person in the relevant fields can clearly understand that, for the sake of convenience and simplicity in description, the specific operation processes of the systems, devices, and units described above can refer to the corresponding processes in the method embodiments mentioned earlier and will not be repeated here.

The embodiments described in this specification are presented in a progressive manner, with each embodiment focusing on the differences from other embodiments. The similar or identical parts among the embodiments can refer to one another.

A person skilled in the art should understand that the embodiments of the present disclosure may be provided as methods, devices, or computer program products. Therefore, the embodiments of the present disclosure can be implemented in the form of a fully hardware embodiment, a fully software embodiment, or a combined software and hardware embodiment. Additionally, the embodiments of the present disclosure can be implemented as computer program products on one or more non-transitory computer-readable storage media, including but not limited to disk storage, CD-ROM, optical storage, etc., containing computer-readable program code.

The embodiments of the present disclosure are described with reference to the flowcharts and/or block diagrams of the methods, terminal devices (systems), and computer program products according to the embodiments of the present disclosure. It should be understood that each process and/or block in the flowchart and/or block diagram can be implemented by computer program instructions. These instructions can be provided to a general-purpose computer, a special-purpose computer, an embedded processor, or other programmable data processing terminal devices to generate a machine, such that the instructions executed by the processor of the computer or other programmable data processing terminal device enable the machine to perform the functions specified in one or more processes or blocks in the flowchart or block diagram.

These computer program instructions may also be stored in a non-transitory computer-readable storage medium that can direct a computer or other programmable data processing terminal device to work in a particular way, such that the instructions stored in the non-transitory computer-readable storage medium produce an article of manufacture that implements the functions specified in one or more processes or blocks in the flowchart or block diagram.

These computer program instructions can also be loaded onto a computer or other programmable data processing terminal device to execute a series of operations steps on the computer or other programmable terminal device, thereby producing a computer-implemented process, so that the instructions executed on the computer or other programmable terminal device provide steps for performing the functions specified in one or more processes or blocks in the flowchart or block diagram.

Although preferred embodiments of the present disclosure have been described, those skilled in the art will recognize that once the basic inventive concept is known, further modifications and changes can be made to these embodiments. Therefore, the appended claims are intended to be interpreted as including the preferred embodiments as well as all changes and modifications that fall within the scope of the inventive concepts of the present disclosure.

Finally, it should be noted that relational terms such as "first" and "second" are used merely to distinguish one entity or operation from another and do not necessarily require or imply any actual relationship or order between these entities or operations. Moreover, the terms "include," "comprise," or any other variation thereof are intended to cover non-exclusive inclusions, meaning that a process, method, item, or terminal device that includes a series of elements not only includes those elements but also includes other elements that are not explicitly listed, or elements inherent to such process, method, item, or terminal device. Elements defined by the phrase "comprising a . . . " are not intended to exclude the presence of additional identical elements in the process, method, item, or terminal device that includes the said elements.

The above embodiments are provided only to illustrate the technical solution of the present disclosure, and not to limit it. Although the disclosure has been described in detail with reference to the embodiments, a person skilled in the art will understand that the technical solutions described in these embodiments can be modified, or some technical features can be equivalently replaced. These modifications or replacements do not depart from the essence, spirit, and scope of the technical solutions of the present disclosure.

What is claimed is:

1. An error compensation method applied in a multi-axis parallel kinematics machine tool, comprising:
   building a theoretical Jacobian model of the multi-axis parallel machine tool to be compensated; and
   obtaining several geometric parameters of the theoretical Jacobian model and constructing a singularized geometric error model according to the geometric parameters; and
   constructing a singularized geometric error model with modeling error based on the theoretical Jacobian model and the singularized geometric error model; and
   solving the singularized geometric error model with modeling error to obtain a singularized geometric error with modeling error;
   substituting the singularized geometric error with modeling error into the theoretical Jacobian model to construct a Jacobian model with correction term; and
   generating a correction value of a motor of the multi-axis parallel machine tool to be compensated based on the Jacobian model with correction term; and
   calculating a corrected total displacement of the motor based on the correction value of the motor; and
   substituting the corrected total displacement into an error prediction evaluation model to calculate predicted compensation errors under different geometric parameters; and
   selecting a minimum predicted compensation error corresponding to each geometric parameter as a target compensation error; and
   compensating the error of the multi-axis parallel machine tool using the target compensation error;
   wherein the step of constructing a singularized geometric error model with modeling error based on the theoretical Jacobian model and the singularized geometric error model comprises:
   calculating a modeling error difference between the theoretical Jacobian model and the singularized geometric error model; and
   substituting the modeling error difference into the singularized geometric error model to construct the singularized geometric error model with modeling error;
   wherein the step of substituting the corrected total displacement into an error prediction evaluation model to calculate predicted compensation errors under different geometric parameters comprises:
   inputting the corrected total displacement of the motor into a virtual linear model to obtain a correction output of the motor; and
   calculating a theoretical virtual output of the virtual linear model under a theoretical input of the motor; and
   calculating a first output ratio between the correction output and the theoretical virtual output; and
   obtaining an actual model deviation coefficient; and
   calculating a second output ratio between the correction output and an actual physical model output based on the actual model deviation coefficient and the first output ratio; and
   obtaining a kinematic theoretical output of the virtual linear model under the theoretical input of the motor; and
   calculating the predicted compensation errors under different geometric parameters based on the second output ratio and the kinematic theoretical output.

2. The error compensation method of claim 1, wherein the step of building a theoretical Jacobian model of a multi-axis parallel machine tool to be compensated comprises:
   obtaining a motor compensation value and an end effector error of the multi-axis parallel machine tool to be compensated; and
   constructing the theoretical Jacobian model based on the motor compensation value and the end effector errors.

3. An electronic equipment, wherein, the electronic equipment comprises a processor and a memory, the memory is configured to store program code and transmit the program code to the processor; the processor is configured to execute the error compensation method of claim 1 based on the instructions in the program code.

4. A non-transitory computer-readable storage medium, wherein the non-transitory computer-readable storage medium is configured to store program code, and the program code is configured to execute the error compensation method of claim 1.

* * * * *